US011129371B1

(12) United States Patent
Hollis

(10) Patent No.: US 11,129,371 B1
(45) Date of Patent: Sep. 28, 2021

(54) SELF-CONTAINED UNIVERSAL MINI TERRARIUM

(71) Applicant: Nathan Alan Hollis, Dallas, TX (US)

(72) Inventor: Nathan Alan Hollis, Dallas, TX (US)

( * ) Notice: Subject to any disclaimer, the term of this patent is extended or adjusted under 35 U.S.C. 154(b) by 461 days.

(21) Appl. No.: 15/959,187

(22) Filed: Apr. 21, 2018

Related U.S. Application Data

(63) Continuation-in-part of application No. 29/635,141, filed on Jan. 29, 2018, now Pat. No. Des. 815,977.

(51) Int. Cl.
| | | |
|---|---|---|
| *A01K 63/00* | (2017.01) | |
| *A01G 9/02* | (2018.01) | |
| *A01K 63/04* | (2006.01) | |
| *F21Y 115/10* | (2016.01) | |

(52) U.S. Cl.
CPC .............. *A01K 63/006* (2013.01); *A01G 9/02* (2013.01); *A01K 63/04* (2013.01); *F21Y 2115/10* (2016.08)

(58) Field of Classification Search
CPC ...... A01K 63/003; A01K 63/006; A01G 9/02; A01G 9/028; A01G 9/0295; A01G 9/042; A01G 9/20
USPC ...................... 119/246, 248, 251, 269; 47/69
See application file for complete search history.

(56) References Cited

U.S. PATENT DOCUMENTS

| | | | | |
|---|---|---|---|---|
| D240,448 S | * | 7/1976 | Hitomi ........................ | D11/145 |
| 4,189,867 A | * | 2/1980 | Schneck ............... | A01G 31/02 47/62 R |
| 5,430,972 A | * | 7/1995 | Wianecki ................. | A01G 9/02 47/66.6 |
| D397,521 S | * | 8/1998 | Gomi .......................... | D30/101 |
| 5,833,137 A | * | 11/1998 | Liao ........................ | A01G 9/16 239/14.1 |
| 2002/0184820 A1 | * | 12/2002 | Mauney ................. | A01G 31/00 47/60 |
| 2003/0150394 A1 | * | 8/2003 | Wolfe .................. | A01K 63/042 119/246 |
| 2006/0272210 A1 | * | 12/2006 | Bissonnette ........... | A01G 31/02 47/69 |
| 2007/0246413 A1 | * | 10/2007 | Pulice .................. | A01K 63/006 210/167.21 |
| 2008/0083163 A1 | * | 4/2008 | Amsellem .............. | A01G 9/042 47/66.6 |
| 2008/0302002 A1 | * | 12/2008 | Schmidt ............... | A01G 27/003 47/48.5 |
| 2009/0229533 A1 | * | 9/2009 | Marks .................. | A01K 63/065 119/260 |
| 2014/0026474 A1 | * | 1/2014 | Kulas ....................... | A01G 9/16 47/1.7 |
| 2017/0094914 A1 | * | 4/2017 | Paquette ................ | F21V 14/006 |
| 2018/0035626 A1 | * | 2/2018 | Bailey .................... | A01G 31/06 |

(Continued)

FOREIGN PATENT DOCUMENTS

JP 10117625 A * 5/1998

*Primary Examiner* — Lisa L Tsang
(74) *Attorney, Agent, or Firm* — Stephen E. Zweig

(57) ABSTRACT

A compact (such as a 4"×7'×7") decorative, self-contained, internet-connected low maintenance terrarium that is completely passive and contains no moving parts. The terrarium device is such that it can sustain itself, with no human maintenance necessary, for several weeks at a time. The terrarium has a computer processor, wireless connectivity, one or more LED lights, and a durable optical water sensor and reservoir design. The terrarium is configured with embedded and connected logic for full internet of things (IoT) functionality.

10 Claims, 12 Drawing Sheets

(56) References Cited

U.S. PATENT DOCUMENTS

2018/0192621 A1* 7/2018 Valatka ................ A01K 63/045
2018/0288948 A1* 10/2018 Croteau ................... A01G 9/20

* cited by examiner

SELF-CONTAINED UNIVERSAL MINI TERRARIUM

CROSS REFERENCE TO RELATED APPLICATIONS

This application is a continuation in part of U.S. design patent application Ser. No. 29/635,141, filed Jan. 29, 2018, the entire contents of which are incorporated herein by reference.

BACKGROUND OF THE INVENTION

Field of the Invention

This invention is in the field of terrariums, in particular wirelessly controlled terrariums.

Description of the Related Art

Terrariums have long been used for both decorative and educational purposes. Such devices typically comprise enclosures with at least one transparent wall through which outside observers can view specimens that have been placed in the terrarium, such as animals, plants, soil, rocks, and other decorative items.

Terrariums are often equipped with a source of moisture, and often electronic lighting, and temperature control elements.

Other workers, such as Bourget, U.S. Pat. No. 8,882,291 taught use of multi-color light emitting diodes (LED) and jumpers to illuminate terrariums with multiple jumper selected colors. Other workers, such as Valatka, et. al., PCT/US2016/043120, have taught terrariums equipped with control hubs and Wi-Fi network interface devices.

BRIEF SUMMARY OF THE INVENTION

Nonetheless further advances in the terrarium art would be desirable. In particular, advances in the art of very small terrariums configured to operate with little or no maintenance on desk tops, book shelves, and the like would be desirable.

In some embodiments, the invention may be a contained terrarium system that allows slow-growing and low-nutrient environment for plants such as succulents, orchids, and carnivorous plants to be grown. The device is capable of sustaining itself with little to no maintenance necessary for weeks at a time.

The soil layers, LED light, and ventilation together provides a great deal of water efficiency, requiring no external reservoir, fans, or cooling. Also, no addition of fertilizer is necessary due to top organic soil layer. The device features embedded software controls and network connectivity. The software will control the artificial light, syncing it to local time, therefore not requiring the user to turn on the device in the morning or off at night.

The invention's terrarium device will typically have one or more air ventilation slits or holes for allowing air to permeate the device. Although the device will usually employ passive ventilation methods, use of active air transport mechanisms such as small electrically operated fans is not disclaimed.

In addition, an optical liquid level sensor is situated in the reservoir layer, allowing the device to sense and communicate the water level, taking action if needed to protect the plants from drying up. The device also features a water window in the front for manually viewing the water level in the reservoir.

As will be discussed (see FIG. 4A-C) the invention's terrarium device will often feature a raised or hollow base where coarse porous medium or charcoal can be placed. The insert can also function to separate the soil from the device's reservoir water and water sensor. The screen separates the base layer from the top organic soil layer. As will be discussed, in a preferred embodiment, the invention will use an optical liquid water sensor that senses water optically in this layer, and then relays an electrical signal regarding the water level to the invention's processor.

In some embodiments, as will be discussed, the device may also comprise a visual inspection window that allows the user to manually inspect the water level within the base (soil) layer.

In some embodiments, as will be described, the terrarium device may feature an LED indicator light on the front that allows nearby users to directly look at the LED indicator, and obtain information as to the device's status (e.g. warning colors if the water levels are too low, and the like).

In some embodiments, the terrarium device may also have at least one front button configured to allow the user to directly control the terrarium though various pushes or taps. The button, which has output going to the terrarium's processor, may be configured, usually with suitable processor software, to do one or more user-controlled functions such as turn the device on or off, dim the lights, check the water level, change networking settings, and change other device settings.

As will be discussed, the invention's terrarium device may additionally have various computer network and automated controls intended to facilitate ease of plant growing. The device typically has computer and network assisted control in order for it to function with little input required from the user, and corrective actions or indicators can be automatically applied by the system's computer processor(s) in the event that the system sensors detect conditions outside of intended operating parameters.

In particular, the system may be configured with software to implement various operations. For example, if sensors detect lack of water, the system may be configured to reduce the main LED lighting output (e.g. dimming or blinking the main terrarium light) and/or causing the terrarium's indicator LED status light to blink, change color, or otherwise notify the user that water levels are too low. The device may also be configured to send alert messages over the computer networks (e.g. terrarium device processor linked by local Wi-Fi wireless coverage, upon sensing low water or other problem can, in turn, notify a cloud server, and/or communicate with a user smartphone directly).

As will be discussed, the system can also be configured to automatically turn the main terrarium illumination light(s) on and off, for example, to sync with local sunrise and sunset times. Alternatively or additionally, the lighting effects (e.g. color, intensity) can be varied based on the current weather or climate, as reported to the terrarium processor by an outside cloud server, or directly by the user using a smartphone.

DETAILED DESCRIPTION OF THE INVENTION

Figure 1A:
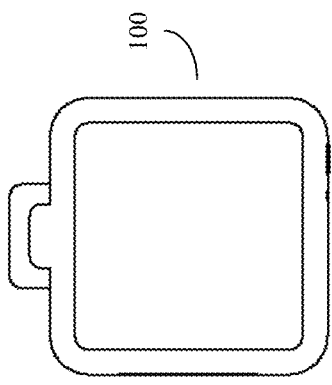
FIG. 1A shows a top plan view of the terrarium device.

In some embodiments, the invention may be a terrarium device that can be configured as a miniature decorative, self-contained, internet-connected low maintenance terrarium. In some embodiments, this terrarium device may be equipped with its own computer processor, and be configured for internet of things (IoT) functionality.

In some embodiments, the invention may be an IoT miniature terrarium that provides a low-nutrient environment optimized for slow-growing and low-nutrient requiring plants such as succulents, orchids, and carnivorous plants. The invention allows these types of plants to be grown in a self-contained box that requires only the addition of water and can be implemented with no moving parts as desired.

In a preferred embodiment, the invention is a terrarium device configured to be capable of sustaining itself, with no human maintenance necessary, for several weeks at a time. The terrarium device may be configured with soil layers, one or more low-heat computer-controlled LED lights. The invention will often also have a passive ventilation system configured to conserve water, and does not feature an external reservoir, fans, or cooling.

In some embodiments, the invention's terrarium device features at least one embedded processor with software controls and network (e.g. Wi-Fi network, internet, etc.) connectivity. The invention's software can be configured control the system's artificial light (LED light). For example, the software may be configured to synchronize the system's artificial light to local time, therefore not requiring the user to turn on the device in the morning or off at night.

In some embodiments, the terrarium device's software can be configured to be capable of syncing to the current weather, making the device configurable to report weather by altering the intensity or color of the lighting system in synchronization with the local weather, as desired.

In addition to Wi-Fi and network control, the terrarium device also provides a streamlined direct user interface by providing a front button that is capable of turning the device on and off, and also configuring the device directly to a limited extent. The terrarium device also provides an indicator light (which may change color depending upon terrarium status) to allow users to directly see the state of certain terrarium parameters, such as moisture/water levels.

In some embodiments, the terrarium may provide two alternative ways of determining moisture/water levels. The terrarium can provide a "notch" or "water window" configured to allow the user to directly see the moisture levels in the reservoir layer to an inch or more below the nominal terrarium soil levels.

Additionally, in a preferred embodiment, the terrarium device will also be configured with at least one liquid level sensor that can electronically report on moisture levels. In a preferred embodiment, for higher durability, this moisture/liquid level sensor may be an optically based sensor, with an electronic output, configured as described herein. This optical sensor with electronic output can be configured to sense and communicate the water level to the system's processor, and via the onboard computer and Wi-Fi network to the user. This allows the user to take action (e.g. to add more water) if water levels get too low.

FIG. 1A shows a top plan view of the terrarium device.

Figure 1D:
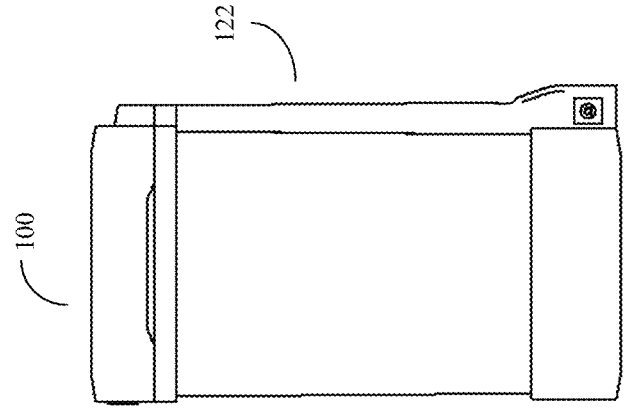
FIG. 1D shows a right side elevational view of the terrarium device.
Figure 1C:
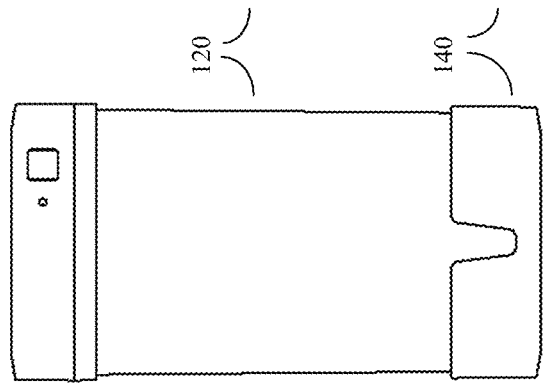
FIG. 1C shows a front elevational view of the terrarium device.
Figure 1B:
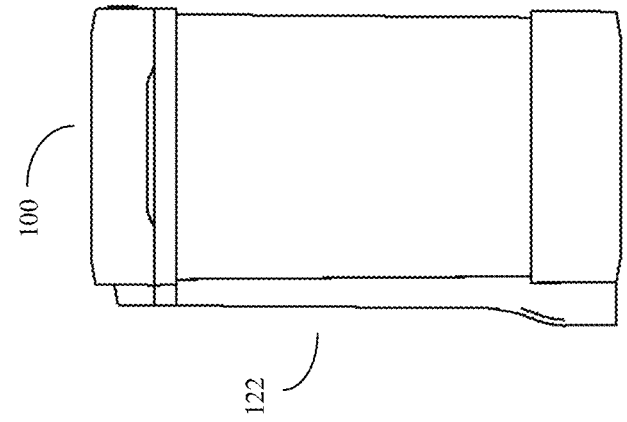
FIG. 1B shows a left side elevational view of the terrarium device.

FIG. 1B shows a left side elevational view of the terrarium device.

FIG. 1C shows a front elevational view of the terrarium device.

FIG. 1D shows a right side elevational view of the terrarium device.

In some embodiments, the invention may be an automated terrarium device, shown in various views in FIG. 1A, FIG. 1B, FIG. 1C, and FIG. 1D.

The terrarium device can be a hollow and substantially rectangular solid, or prismatic in shape. It will typically comprise an enclosure with transparent sides (120), as well as a detachable top portion (100), and a bottom portion (140).

The terrarium will also have a rectangular spine (122) affixed to one of these transparent sides. This spine will be configured to connect the detachable top portion (100) to the bottom portion (140).

Figure 2:
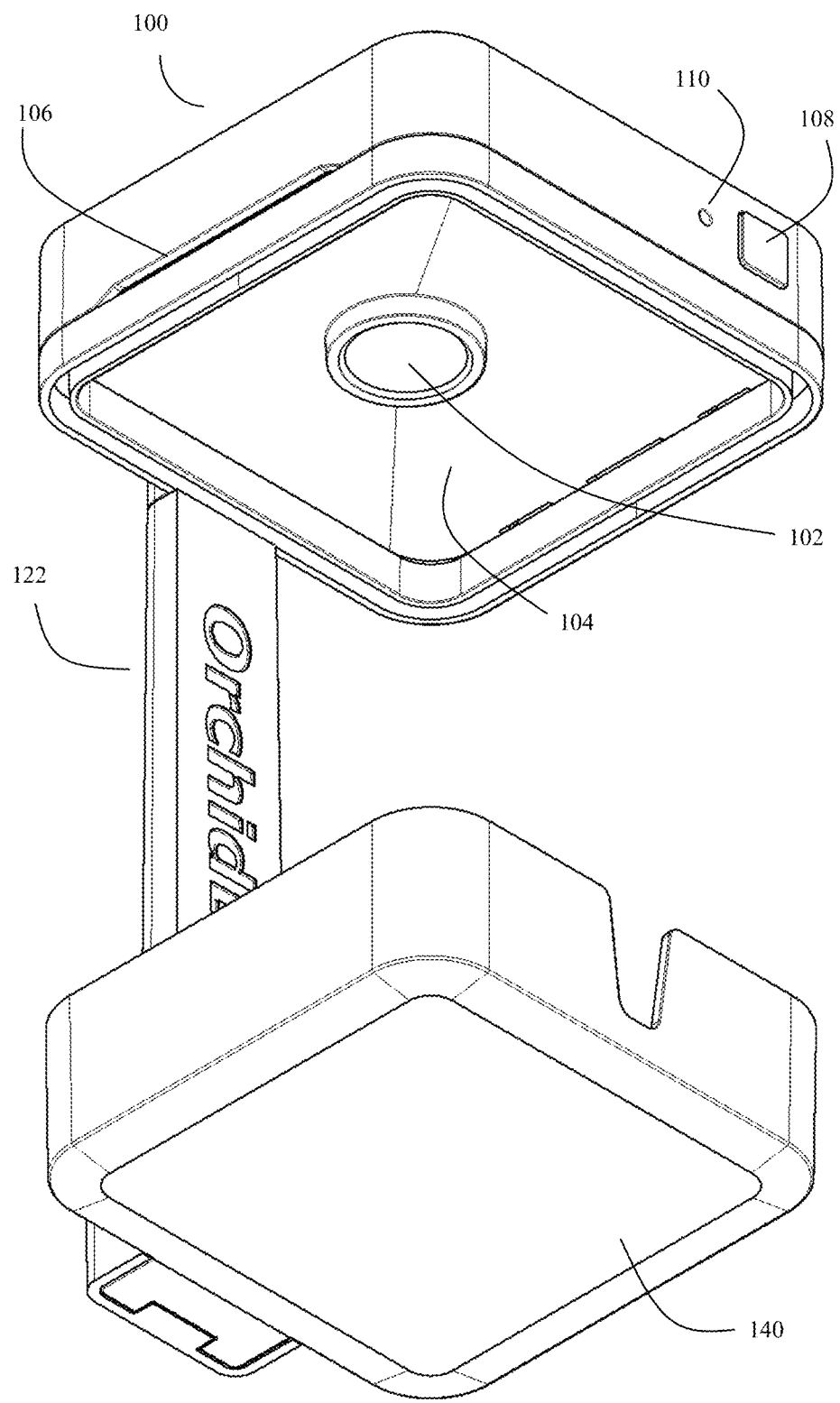
FIG. 2 shows a bottom perspective view of the terrarium device, here shown without the transparent enclosure, showing a detail of the terrarium's snap on top containing the main LED light, control electronics, control switch, and indicator light. A plastic spine is used to conduct power cables to the top from a power input jack mounted in the base (not shown).

As shown in FIG. 2, the detachable top (100) can further comprise at least one illumination LED (102) affixed to a heat sink (104). The detachable top (100) will often further have indentations, holes or slits (106) configured so that when the top (100) is attached to the enclosure (120), air can still flow into and out of the terrarium.

The detachable top (100) will further comprise at least one switch (108) and at least one indicator light (110), as well as at least one processor and at least one wireless (such as a Wi-Fi or Bluetooth) transceiver (which may be on the same chip).

Figure 3:
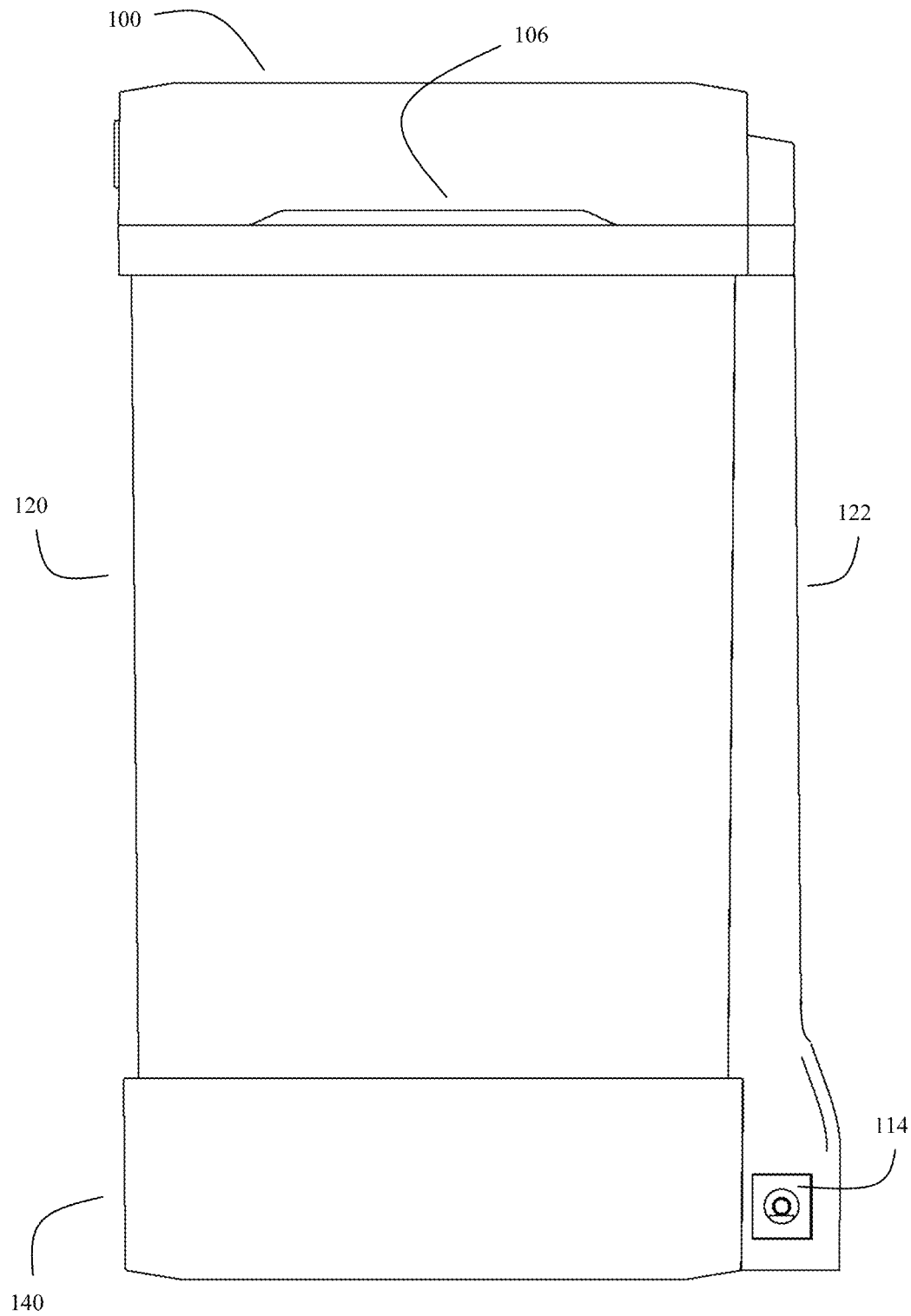
FIG. 3 shows a closeup of the right side elevational view of the terrarium device, here showing a ventilation slot and a power jack connected to the lower portion of the spine.
Figure 9:
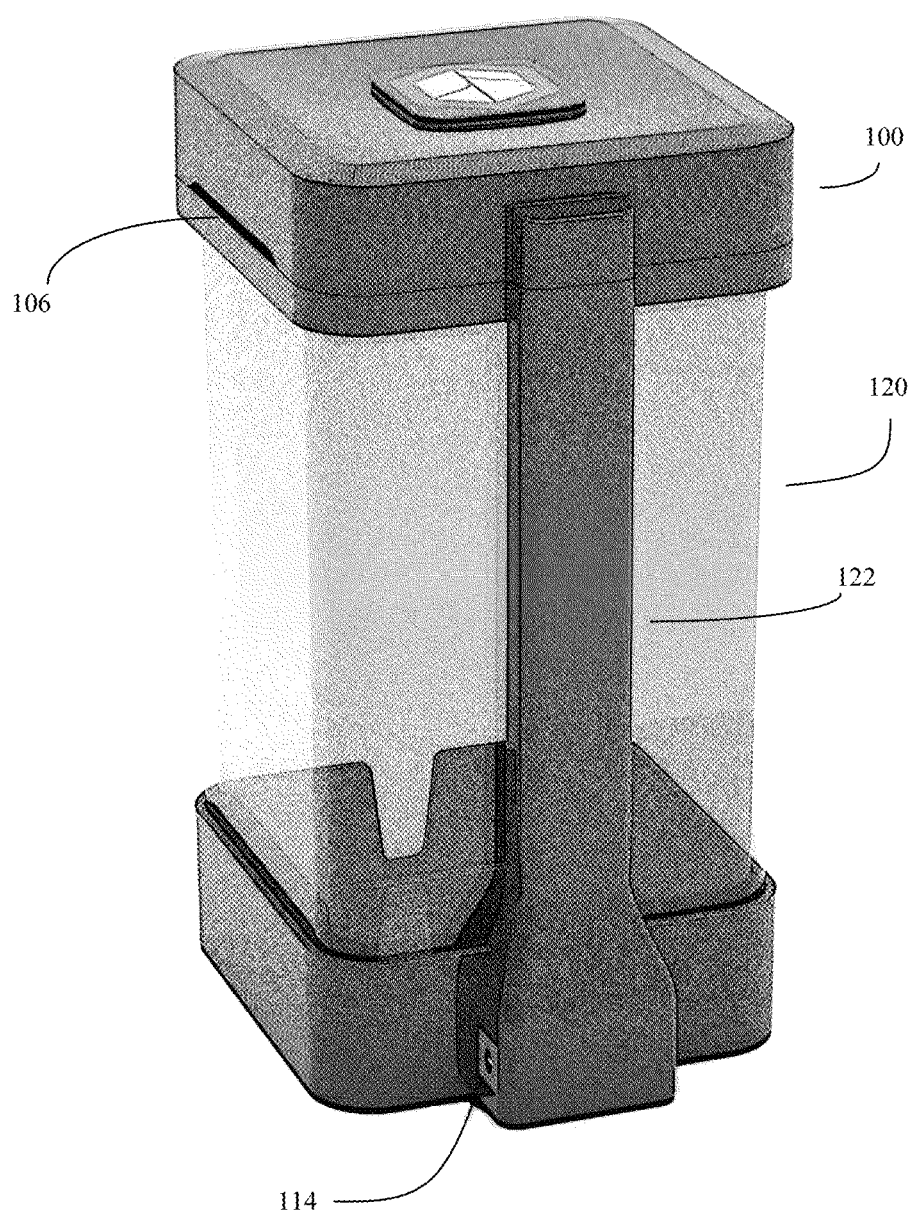
FIG. 9 shows a back top perspective view of the terrarium device previously shown in FIG. 8, here without plants and soil.

As shown in FIG. 9, the detachable top (100) is also configured to receive electrical power from electrical wires (112). These electrical wires (112) that convey power from an electrical power connector in the base of said spine, which is shown in FIG. 3 (114).

Figure 4A:
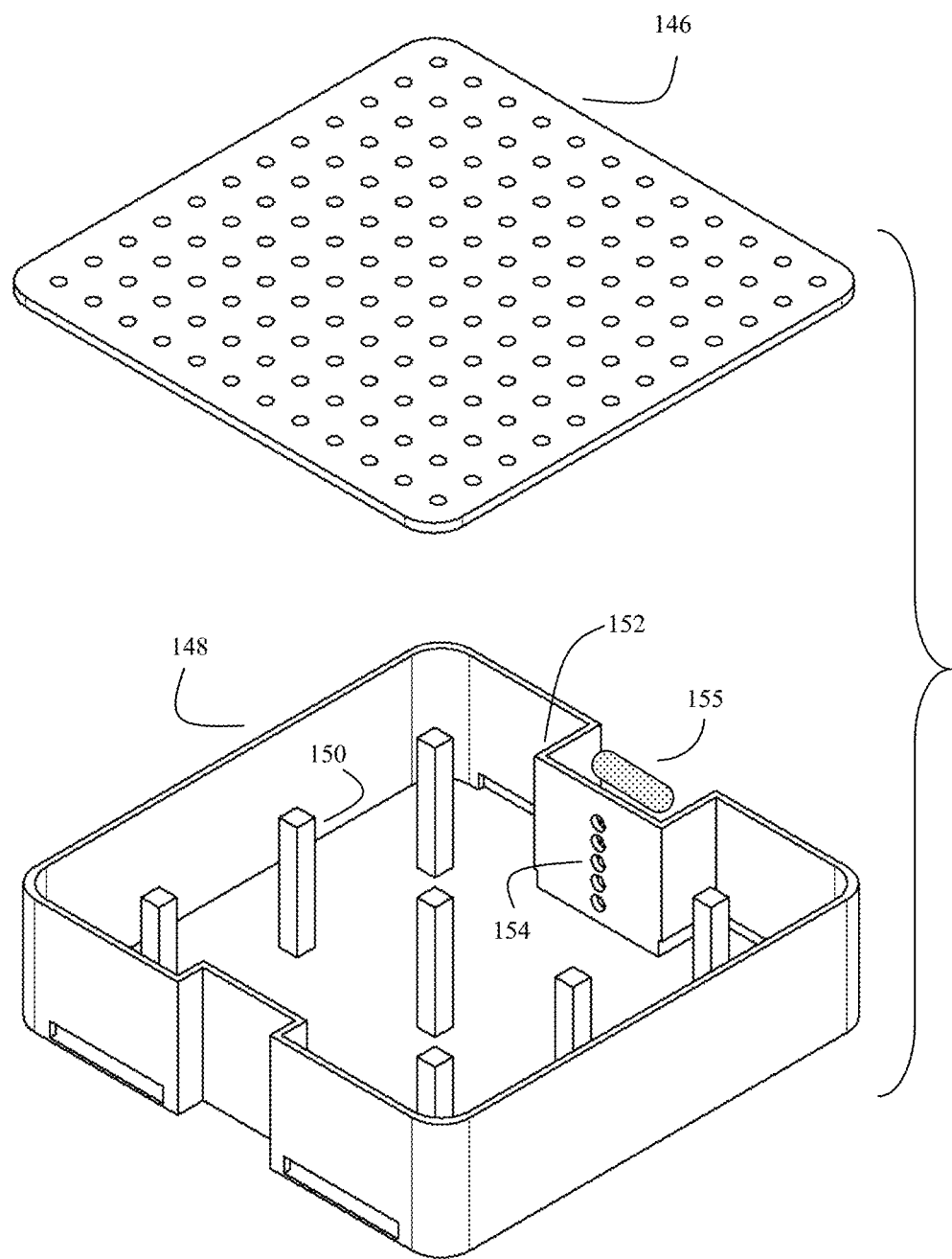
FIG. 4A shows an exploded diagram of the base insert of the terrarium device. Generally, the perforated top helps to support the terrarium soil but allows water from the base to moisten the soil. The perforated top is supported by various plastic supports.
Figure 4B:
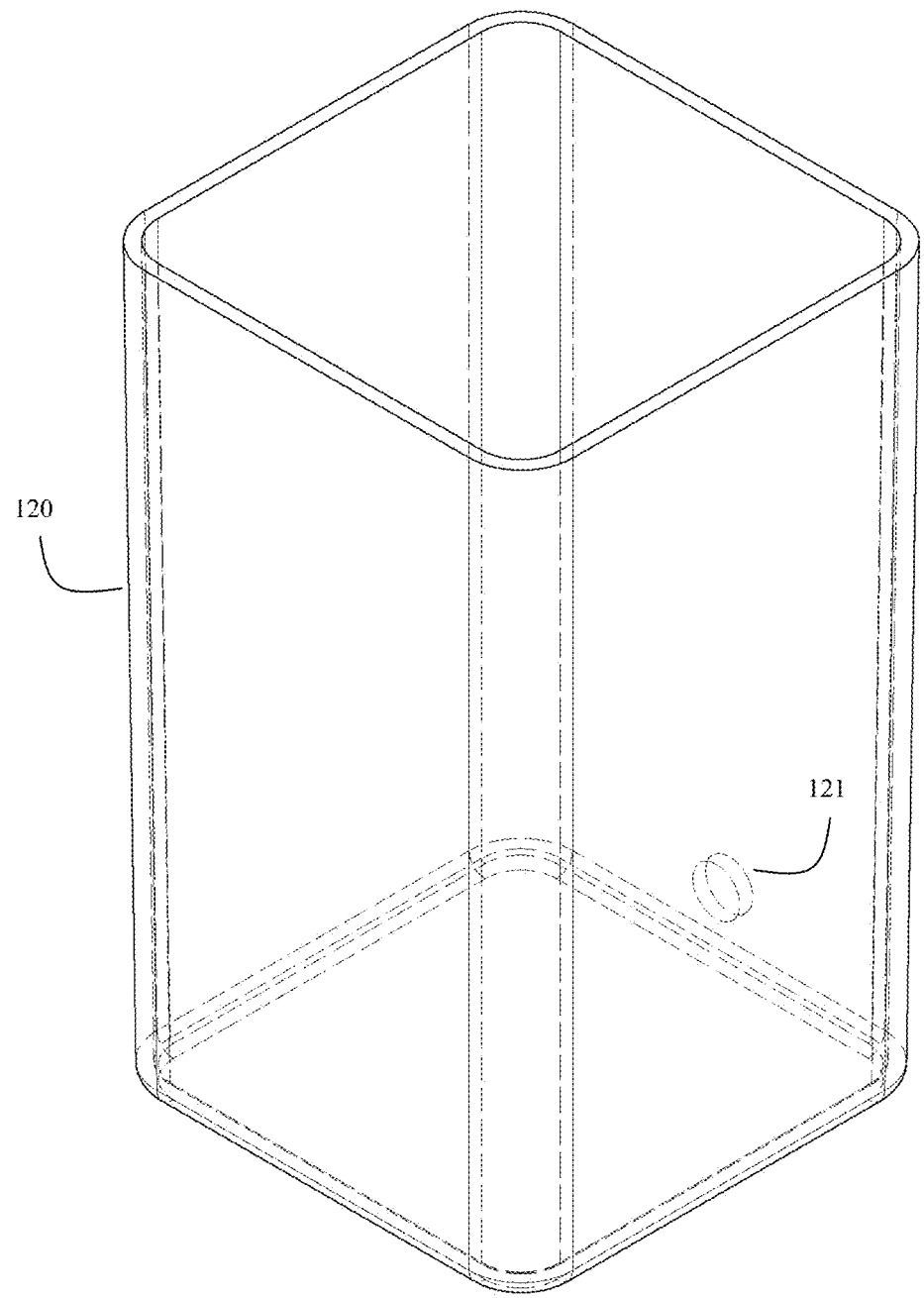
FIG. 4B shows the hollow transparent housing for the terrarium and the through hole for which the optical sensor is mounted.
Figure 4C:
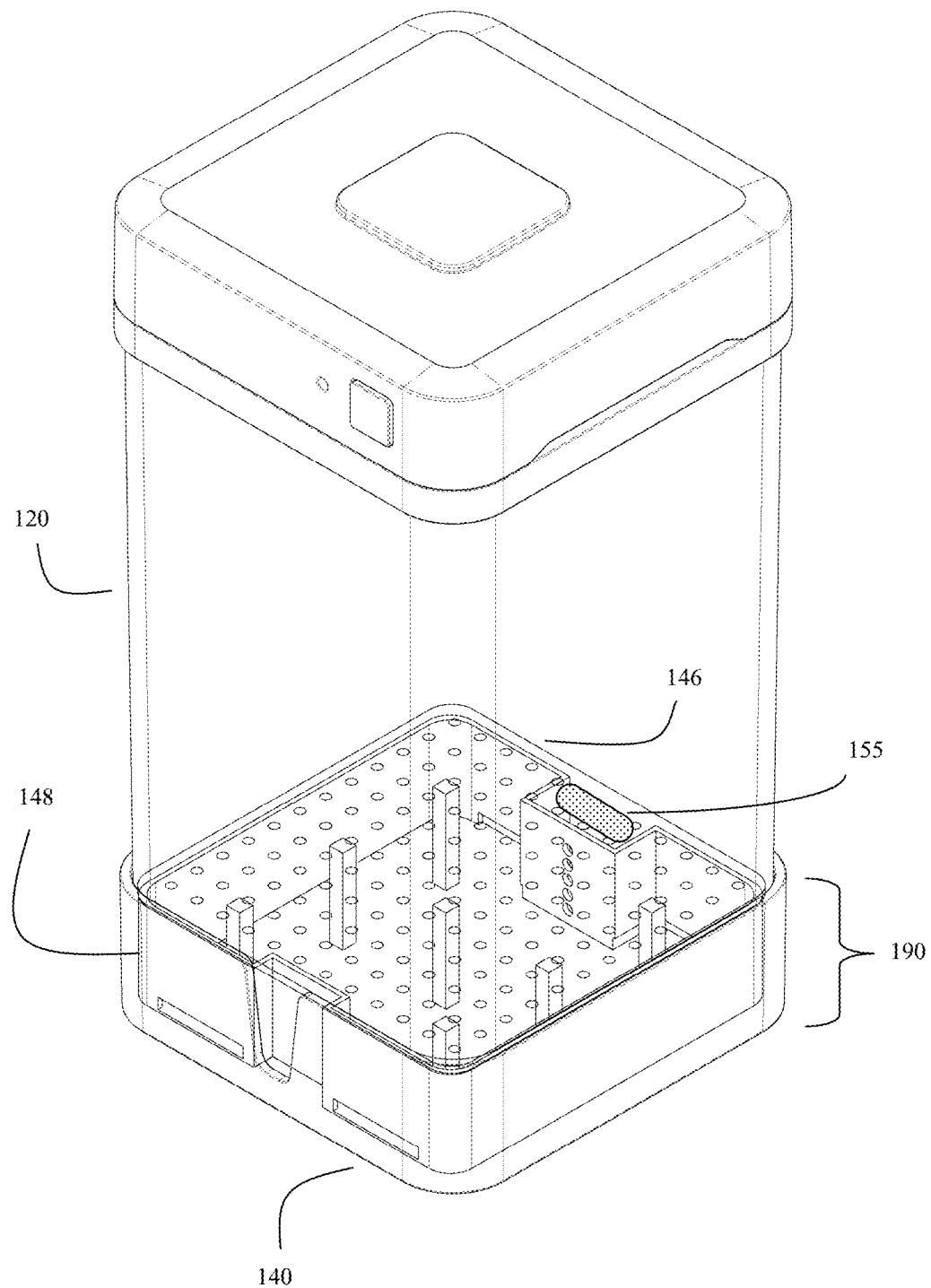
FIG. 4C shows the reservoir base insert inside of the acrylic housing contained within the bottom recess.
Figure 5:
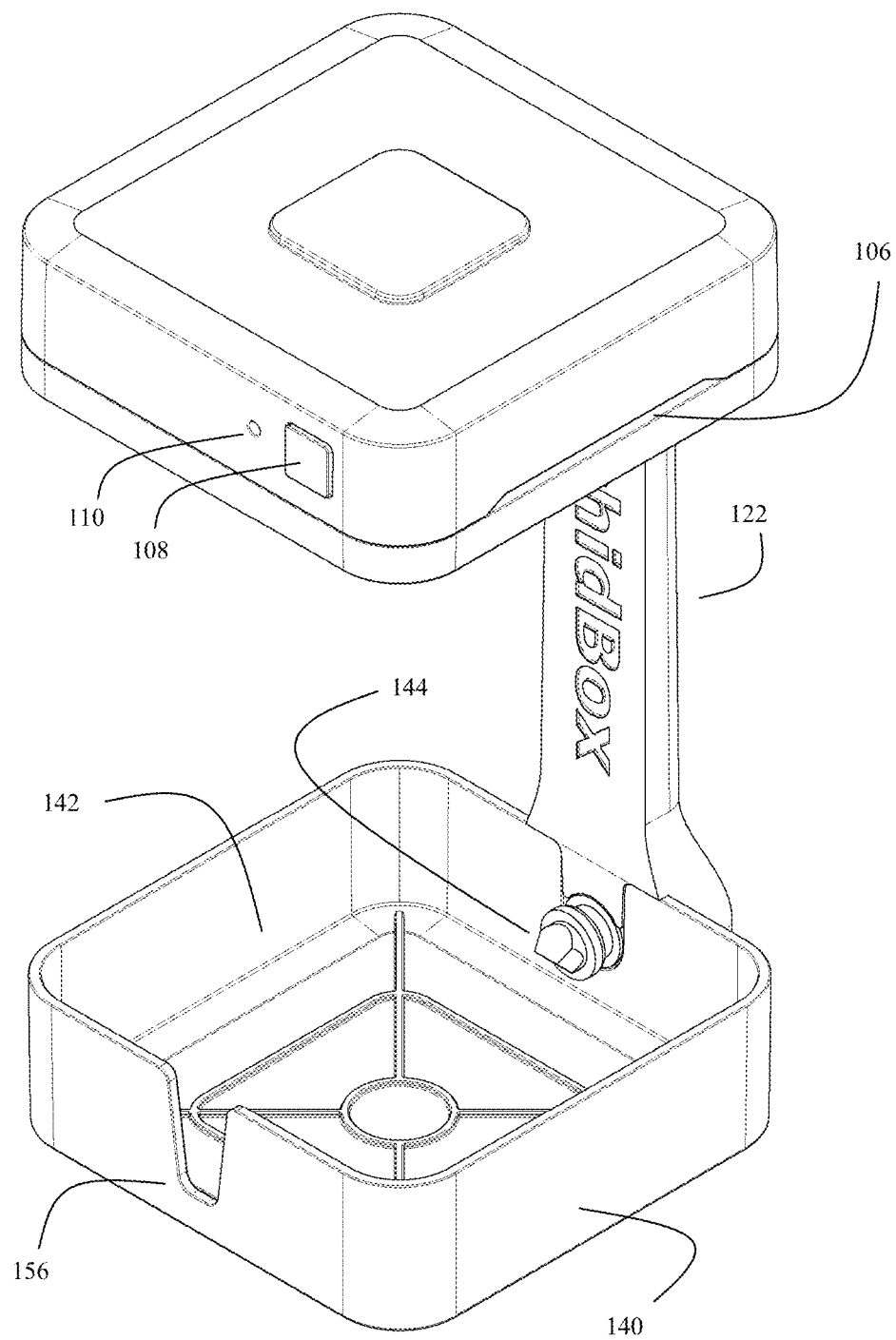
FIG. 5 shows a top perspective view of the terrarium device, again shown without the transparent enclosure. The base has a viewing notch so that the user can view the water level in the base reservoir layer directly. The unit's ventilation slits, control button, and indicator light are also shown.

As shown in FIG. 5, the bottom portion (140) is typically configured with a recess (142) shaped to conceal parts of the reservoir layer from the viewer. The bottom portion (140) is also configured to receive a side of the spine (122) which houses an optical water level sensor (144) with an optical face (oriented towards recess 142) that is mounted through the clear container and sealed. See FIG. 4A-C for more details.

The optical water sensor is configured so that information pertaining to water levels in the bottom portion (140) and reservoir layer (190) is electrically transmitted from the optical water level sensor (144) via the spine wires (112) to the terrarium processor. As will be discussed, this processor will be configured so that this water level information is used to control at least one mode of operation of the automated terrarium device.

Typically the terrarium processor and the wireless transceiver are configured to wirelessly connect and exchange information with other computerized devices using any of a Wi-Fi or Bluetooth wireless connection, as will be discussed in more detail shortly.

FIG. 2 shows a bottom perspective view of the terrarium device, here shown without the transparent enclosure (120), showing a detail of the terrarium's snap on top (100) containing the main LED light (102), control electronics, control switch (108), and indicator light (110). A plastic spine (122) is used to conduct power cables FIG. 5 (112) from a power input jack (114) mounted in the base (FIG. 3 and FIG. 9) to the top (100).

FIG. 3 shows a close-up of the right side elevational view of the terrarium device, here showing a ventilation slot (106) and a power jack (114) connected to the lower portion of the spine (122).

FIG. 4A shows an exploded diagram of a two-component insert top and bottom (146, 148) that may be placed in the bottom or recess (142) of the terrarium device. Generally the perforated insert top (146), which can either be rigid, or can be a foam material, helps to support the terrarium soil, but allows water from the base to moisten the soil. The perforated insert top (146) can be supported by various plastic supports (150) embedded in the insert bottom (148). The insert bottom (148) can also have a sensor recess (152) with perforated holes (154) allowing for a separating foam or sponge (155) to be placed to protect the optical fluid sensor (144) from any soil or dirt.

FIG. 4B shows the hollow transparent housing for the terrarium (120) and the through hole for which the optical sensor is mounted (121).

FIG. 4C shows the reservoir base insert (148) inside of the acrylic housing (120) contained within the bottom recess (140). Typically the sensor, which is shown in FIG. 5 (144), is housed in the spine and mounted and sealed via a through the hole in the container (121). A piece of foam (155) is present between the base insert and the sensor optic face.

FIG. 5 shows a top perspective view of the terrarium device, again shown without the transparent enclosure (120). The base has an optional viewing notch or window (156) so that the user can view the water level in the reservoir layer directly. The unit's ventilation slits (106), control button (108), and indicator light (110) are also shown.

Figure 6A:
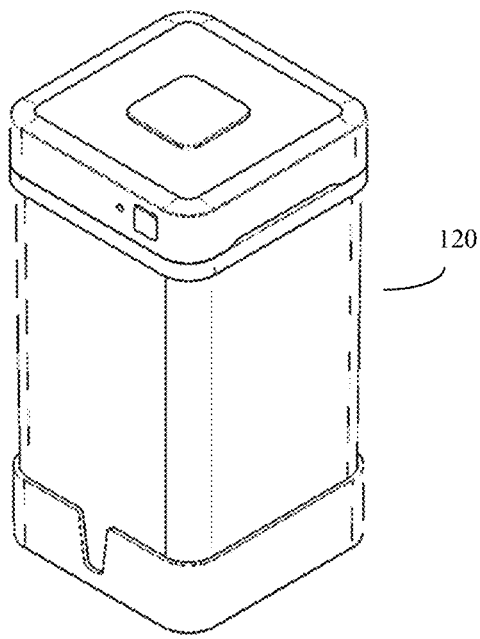
FIG. 6A shows a top perspective view of the terrarium device with the transparent enclosure (here shown as opaque to allow the enclosure to be seen better).

FIG. 6A shows a top perspective view of the terrarium device with the transparent enclosure (120) here shown as opaque to allow the enclosure to be seen better.

Figure 6B:
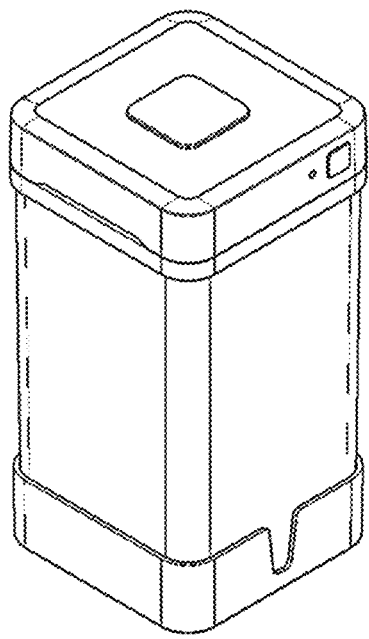
FIG. 6B shows a top perspective view of the terrarium device from a different angle.

FIG. 6B shows a top perspective view of the terrarium device from a different angle.

Figure 6C:
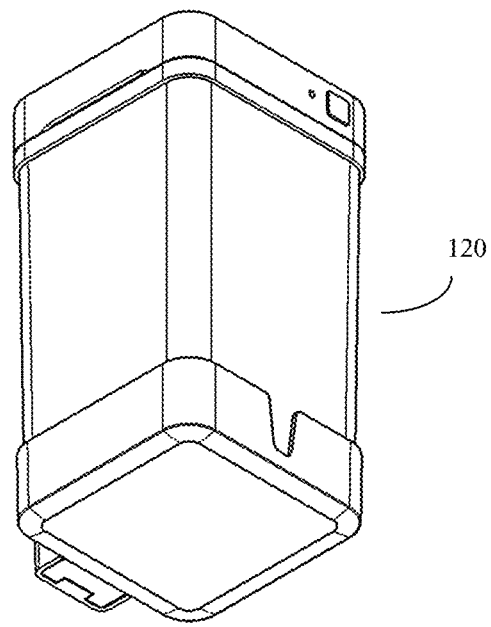
FIG. 6C shows a bottom perspective view of the terrarium device, here with the transparent enclosure (here shown as opaque to allow the enclosure to be seen better).

FIG. 6C shows a bottom perspective view of the terrarium device, here with the transparent enclosure (120) here again shown as opaque to allow the enclosure to be seen better.

Figure 7:
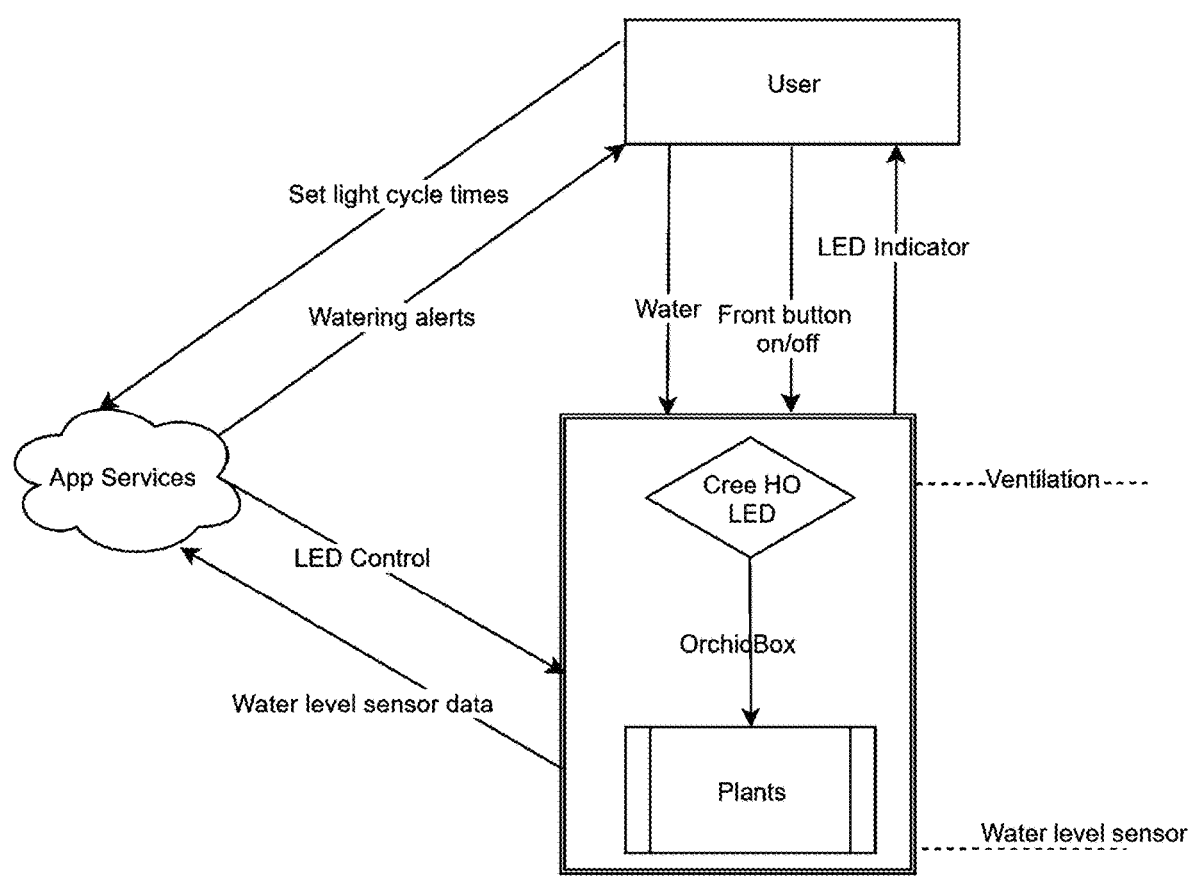
FIG. 7 shows a diagram showing some of the information flow that may be carried by wireless Wi-Fi signals between the terrarium, the user (here to a user smartphone or other Wi-Fi connected computerized device such as a tablet computer), and various application services which may reside on remote internet servers (cloud servers).

FIG. 7 shows a diagram showing some of the information flow that may be carried by wireless Wi-Fi signals between the terrarium, the user (here to a user smartphone or other Wi-Fi connected computerized device such as a tablet computer), and various application services which may reside on remote internet servers (cloud servers).

Figure 8:
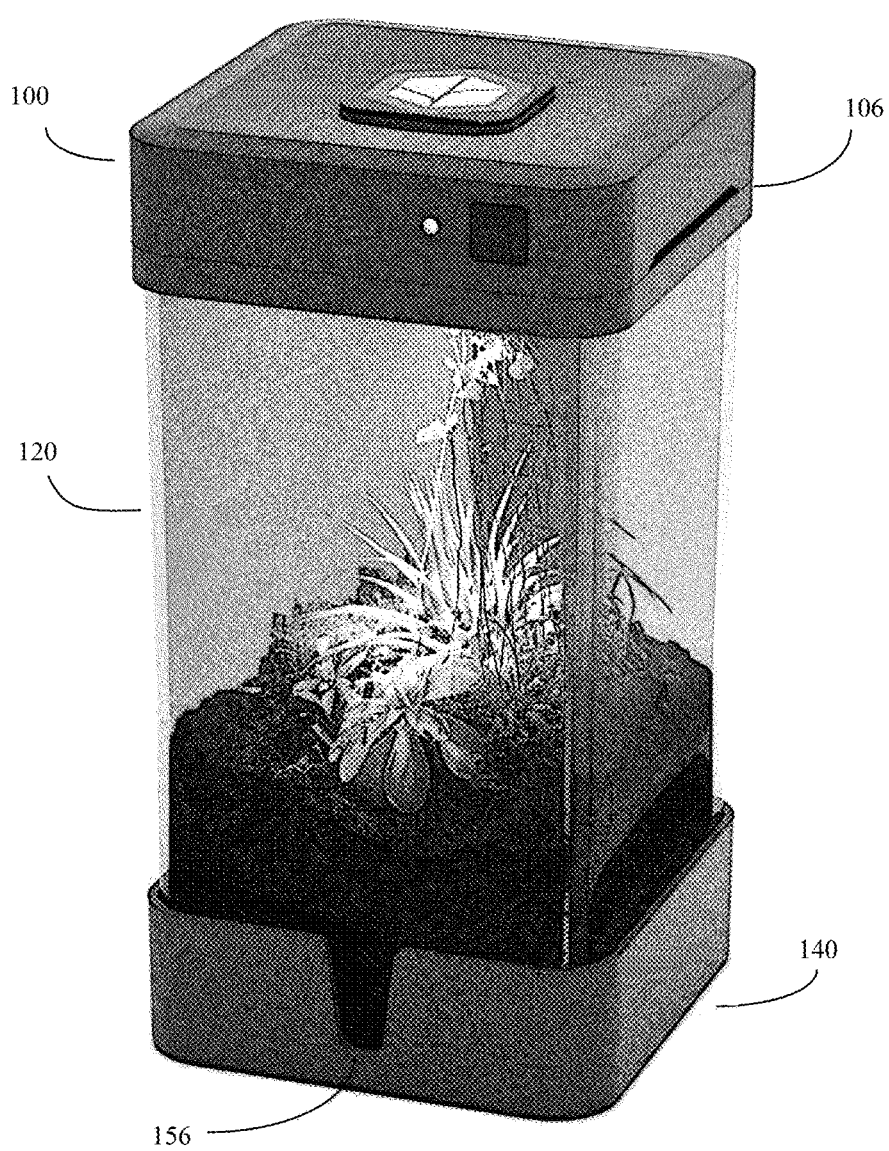
FIG. 8 shows a photograph of a complete terrarium device, here configured with soil and plants, and configured to illuminate the plants.

FIG. 8 shows a photograph of a complete terrarium device, here configured with soil and plants (200), with the main LED light (102) configured to illuminate the plants.

FIG. 9 shows a back top perspective view of the terrarium device previously shown in FIG. 8, here without plants and soil.

Figure 10:
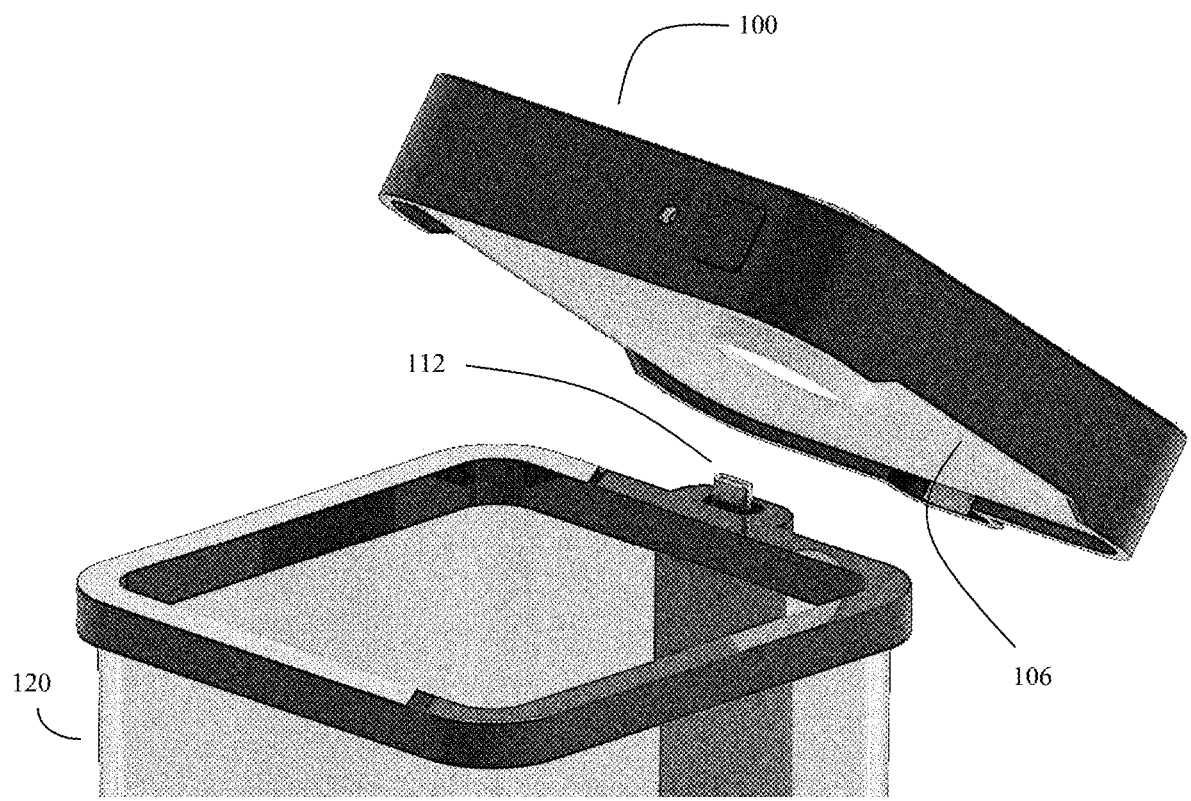
FIG. 10 shows a close up of the terrarium's detachable top, showing the ventilation slit in more detail, a detail of the system's LED and heatsink, and an electrical connector that allows the top, when snapped onto the terrarium's transparent enclosure, to receive electrical power via an electrical connector inside the spine.

FIG. 10 shows a close-up of the terrarium's detachable top, showing the ventilation slit in more detail, a detail of the system's LED system, and electrical connector that allows the top, when snapped onto the terrarium's transparent enclosure, to receive electrical power via an electrical connector inside the spine.

In a preferred embodiment, the terrarium device may be configured with a miniature form factor measuring about 4"×4"×7". The transparent sides (120) or enclosure may be configured using transparent plastic materials, such as acrylic plastic, to form an acrylic box that is transparent. The device also has the previously discussed recess in the lower housing or water window for viewing the water level within the base reservoir layer.

The controls and displays may comprise a front status light (110), such as a blue/red/green low front indicator LED that can function as an indicator light and device interactivity. The control may also comprise a front button (108) configured with various operating modes. For example, single button press to turn on/off light (or override for 2 hours).

The control button (108) may optionally also be configured so that a double tap can change the main LED lighting (102) from dark to maximum brightness by stepping though available light settings. A single tap during this mode can confirm the brightness selection. A triple tap can be used to check the water level, and so on. Alternatively, the control button may be configured with other settings, such as:

tap—turn on/turn off for two hours
press and hold—change brightness level
double tap—turn off/on until sunrise/sunset The embedded electronics will typically comprise a processor, a Wi-Fi transceiver and suitable software to enable the terrarium device to communicate with other computerized devices such as smartphones, cloud servers, and the like. Suitable processors include processor systems (which may be single chip systems) based on combined processors and Wi-Fi transceivers, such as the Cypress BCM43362 Wi-Fi chip, which combines a STM32ARM Cortex M3 microcontroller with a Cypress BCM43362 Wi-Fi chip. These are available from various vendors such as Particle Information Technology and Services, San Francisco, Calif., and other vendors.

In some embodiments, the terrarium's software can be configured to monitor the system's water sensors (144) to determine if the water level is above a preset minimum, and if not to shut off, dim or otherwise run the high-intensity terrarium lights (102) when the water level is too low. Alternatively, the software will run the indicator lights (110) in an unusual mode when the water level is too low. For example, if a green/red or blue/red LED indicator light is used, the software may set the indicator light (110) to green or blue if the water level is adequate or red if the water level is too low.

In some embodiments, the terrarium software can also be configured, often with the use of the Wi-Fi system and connectivity to clock equipped external devices or weather API/databases, to retrieve the current sunset and sunrise times and use these times to control the terrarium lighting.

Main Illumination Lights

The terrarium will generally have at least one wide spectrum (e.g. white) high-power LED (102) to provide energy to grow any plants. In some embodiments, this high-power LED may have a color optimized for plant growth, rather than general illumination. In some embodiments, the high-power LED may comprise one or more different color LEDs such as a RGB 3-channel LED to enable the terrarium illumination to be more precisely controlled to match ambient light, to match outside illumination, or to provide mood lighting. The high-power LED light will typically be attached to a fanless heatsink to prevent overheating. This fanless heatsink may be part of the housing itself or configured to passively vent excess heat outside the terrarium.

In some embodiments, the illumination LED (102) may be a multi-unit LED, such as a Cree J series 3030 (×4), which comprises four different 0.5-watt LEDs, packaged together, using about 2 watts power, and producing a light output of 350 Lumens at about 4000K color temperature. Given the dimensions of the terrarium device, the plants growing under these conditions receive about 24 lumens per square inch at 4000K color temperature.

This LED light may be further focused with a reflector/lens system, such as a Carclo 10.0 mm Narrow Spot Plain TIR reflector/lens (Model 10622) or other light focusing system as appropriate. This is an acrylic (plastic) TIR reflector/lens fits over the LEDs and is mounted to the LED circuit board. The net effect of this reflector/lens system is to direct the LED light down towards the plants. Without such optical systems, the light tends to bleed everywhere which is not pleasant to look at.

Ventilation

In some embodiments, such as previously disclosed in parent application Ser. No. 29/635,141, the entire contents of which are incorporated herein by reference, the terrarium device may have one or more ventilation holes penetrating through the transparent sides (120) of the terrarium. However in other embodiments, ventilation may be provided by one or more ventilation slits (106). One aesthetically pleasing and functional method is to configure a removable top of the terrarium (100) with side slits or indentations (106) so that at least limited amounts of air can enter and exit the terrarium. Generally, in order to avoid losing too much moisture to outside air, the slits can have minimal air gaps, such as rectangular air gaps about 2" wide by ⅛" tall, in order to conserve moisture. Such configurations conserve water, and thus the terrarium will often only need to be watered every 3-4 weeks.

Fluid or Moisture Sensors

Although pure electronic sensors can be used, such as electrical resistance based sensors, or electrolytic sensors, such sensors often can become fouled or otherwise can lose sensitivity/become inactive over time. Thus in a preferred embodiment, it will be useful to employ fluid moisture sensors that avoid direct contact with the soil, but instead detect moisture level using optical techniques, and then transduce this optical signal to an electronic signal which then can be input to the system's processor(s).

The invention's optical liquid level sensor (144) system can last many years longer than other electrolytic sensor types when used with soil. In a preferred embodiment, this optical sensor may be placed in the filtered reservoir portion of the unit, underneath the soil support layer (146).

The sensor is separated from any soil or dirt by small openings in the base (154), then a porous hydrophilic sponge or filter layer (155). The combination of direct exposure to water only (no soil or other particles), and the more uniform moisture within the sponge allows the sensor to behave much more consistently between different terrarium units and soil types.

Thus in a preferred embodiment, the system will measure terrarium soil moisture by using a combination of a porous base layer in the terrarium and an inner plastic insert that separates the soil base layer from the rest of the terrarium, allowing water to flow out of the insert but remaining inside the box.

This acrylic, optical liquid level sensor (144) is mounted inside the box, often in a recess (152) that places the sensor (144) outside of an inner plastic insert (148). A foam material (155) may be placed between the plastic insert (148), recess (152) and the sensor (144). This allows the water to seep out of the insert, through holes (154) and saturate the foam material. Because the foam is of uniform porosity, this leads to more uniform readings from the optical liquid level sensor. This optical sensor (144) will be discussed in more detail shortly.

Soil

Many different types of soil may be used with the terrarium device. Some of these types are described and are commercially available online and by mail at sites such as repotme.com, and other sites. According to the invention, water is wicked up from the reservoir layer (142), (148), past the perforated support (146) to the soil layer, as well as filtered down from the soil layer, through the filter pad or perforated support (146), and into the reservoir layer. As previously discussed, in a preferred embodiment, the user will typically fill the lowest level of the terrarium (146) with large porous rock or other inorganic, inert, or absorptive material which serves as a water reservoir. Above this, often an inorganic or inert porous filter pad or perforated layer (146) is placed atop the base insert. The soil layer (organic soil, of various types) can then be placed on top of the filter pad or perforated layer (146).

Packaging in Kit Form:

In some embodiments, the invention may be packaged in kit form. This kit may comprise various components including the terrarium device, power adapter (e.g. to convert household AC current to low voltage DC for the terrarium processor and LEDs). The kit can also comprise soil, measuring cups, water pipettes, soil additions, instructions, plants, etc. Usually the kit may also provide links to where online software may be downloaded, as well as links to online servers, and the like.

Software and Software Services

In some embodiments, the invention may be configured with various types of software. This software can include software (essentially embedded software) that can run under one or more processors located in the terrarium device itself, cloud software configured to run on one or more remote internet (cloud) servers, and software configured to run on other devices, such as handheld computerized devices (e.g. smartphones, tablet computers, laptop computers) and the like.

The invention may provide software services, such as a portal (e.g. web server) running on a remote Internet server, as well as apps, such as smartphone apps, that can run on user smartphones and the like. A drawing showing some of these various software services is shown in FIG. 7.

The various terrarium device and system services can include a portal (e.g. internet server web page and remote-control system), and apps, such as software apps to allow direct user interface with the terrarium device. This software can be configured to send configurable alerts to the user's smartphone, or SMS messages, or email messages, when water levels are too low for the desired environment. This software can also let the user check the system water level at any given time, as well as monitor historical water levels or see trends in water levels over time.

The software can also be configured to allow the user to change the terrarium device's main illumination light (LED) (102) settings. Here, for example, the user can set the terrarium's location to determine the local sunrise and sunset time, as well as set various lighting modes. These lighting modes include modes such as a default—Ambient light mode. In some embodiments, the invention's terrarium device may further have an ambient light sensor or a remote ambient light sensor. The user can configure the software to use ambient light readings from the ambient light sensor to turn the main terrarium light on and off—for example, if ambient light is low, turn the terrarium light on, if ambient light is high, turn the terrarium light off. Such a default mode can be useful when the terrarium device is not connected to a Wi-Fi network. When the Wi-Fi network is available, the terrarium device can obtain local sunrise and sunset times from a cloud server (or from the user using the user's smartphone and a suitable app), thus setting the terrarium main lighting to synchronize with the sun. In some cases, the terrarium can run in a "nighttime mode" producing a warmer color (less blue light). As yet another alternative, the terrarium device can also be configured with a nightlight mode that causes the main light to operate at reduced intensity as the evening progresses, or shut off altogether after certain hours in the evening.

Further Optical Sensor Discussion

This aspect of the invention is based, in part, on the observation that many types of water level sensors are unreliable or prohibitively expensive for a small, low-cost terrarium environment. For example, many types of water level sensors are metal plated electrolytic sensors, which (due to electric charge between plates) collect ions from the soil moisture on each end. Unfortunately, in a terrarium environment, there salts build up on these electrodes, causing inaccurate measurements, and eventual sensor failure.

Other water level sensors, such as sensors based on Frequency Domain Reflectometry (FDR) or neutron scattering, are simply too expensive to be practical within the context of the invention.

Experimentation showed that an inexpensive and robust water level sensor could be obtained by a combination of 1) a porous base layer in the terrarium 2) an inner plastic insert that separates the soil base layer from the rest of the terrarium, allowing water to flow out of the insert but remaining inside the box. Lastly, 3) an acrylic, optical liquid level sensor is mounted inside the box but outside the inner plastic insert. 4) a standardized foam insert is placed between the plastic insert and the sensor. This allows the water to seep out of the insert and saturate the foam "cushion". Because the foam is of uniform porosity, it causes leads to much more uniform readings from the optical liquid level sensor. Also, because the parameters of the base layer and foam are constant, it is easy to compare measurements.

In some embodiments, the invention may use an optical sensor such as the Xi' an ESM Tech Company (Shaanxi China) ESM PE19 liquid level switch. This device is a photoelectric switch; with uses optical (specular reflection) methods to determine water levels based on principles of refraction and total internal reflection, and to use this determination to modulate an electrical output using NPN/PNP transistor technology to transduce the measure level of specular reflection to an electrical output signal suitable for sending to the system's processor. A device such as this one consists of 1) an active low-power light source, 2) a clear housing for which the light travels through 3) a path for which the light, when internally reflected, will trigger 4) a photodiode that creates an electrical signal in proportion to the incident light. Specifically, when the water level is lower than a critical level, the optical sensor senses the specular reflection from the sensor body, triggering the sensor to return a higher port voltage in the +5V region. By contrast, when the water level is above the critical level, no such specular reflection is observed as the light travels into the water, and the sensor returns a near zero (less than 0.1V) port voltage to the system processor.

As previously discussed, to avoid having the sensor operate in a binary fashion, the sensor surface is covered with foam, such as Uxcell Aquarium sponge pad (155). This type of sponge pad is hydrophilic, so it becomes rapidly saturated with water up to the water level in the base of the terrarium. As the pad becomes more saturated, the light experiences less total internal reflection as it propagates into the wet pad; conversely, as it dries out, the sensor exhibits less total internal reflection. The amount of total internal reflection is conveyed to the terrarium's processor as an inverse measure of the moisture in the pad.

Typically, these types of sensors have been used only in industrial control applications. Because of the non-linear nature of these sensors they have traditionally been used in binary on-off switches such as those used in aquariums or water tank top-off systems.

An example of a simple software algorithm, configured to run on the terrarium's processor, and report on water levels, is shown below:

Example water level algorithm:
/// Water level basic display
/// -> analogRead values go from 0 to 4095, where 4095 is dry, and 0 is totally wet

```
// ->0 is complete submersion, i.e. no refraction of light to
photovoltaic diode
//
int water_level_threshold_red_flash=3300; //after this,
will flash red and dim lights and shutdown device
int water_level_threshold_greenMax=2800;
bool checkWaterLevel( ) {
int waterLevel=getWaterLevel( )
if (waterLevel>water level_threshold_red_flash){
    analogWrite(redLightPin, 255);
    analogWrite(greenLightPin, 0);
    delay(250);
    analogWrite(redLightPin, 0);
    delay(250);
    analogWrite(redLightPin, 255);
return false;
}
else if(waterLevel>water_level_threshold_greenMax &&
    waterLevel<water_level_threshold_red_flash)
{
    float rgLightVal=(waterLevel-water_level_threshol-
       d_red_flash)/(float)(water_level_threshold_red_
       flash-water_level_threshold_greenMax); //0 is red,
       1 is green
    int rLight=(1-rgLightVal)*255;
    int gLight=rgLightVal*255;
    analogWrite(redLightPin, rLight);
    analogWrite(greenLightPin, gLight);
}
else
{
    analogWrite(redLightPin, 0);
    analogWrite(greenLightPin, 255);
}
    return true;
}
```

The invention claimed is:

1. An automated terrarium device, comprising:
a single hollow substantially rectangular solid, without a door, comprising four transparent sides, a substantially square detachable top portion, and a substantially square bottom portion, with a rectangular spine affixed to one of said transparent sides, and configured to connect said detachable top portion to said bottom portion;
said detachable top portion further comprising at least one illumination light emitting diode (LED) attached to a heat sink, said detachable top potion further comprising indentations or slits configured to allow air to flow into and out of said terrarium when said detachable top portion is mounted on said single substantially rectangular solid, said detachable top portion further comprising at least one control switch and at least one status indicator light;
said detachable top portion further comprising at least one processor; said detachable top portion configured to receive electrical power from an electrical connector in said spine;
said bottom portion configured with a removable insert and recess configured to hold water and soil material, and configured to receive a side of said spine and allow transfer of water from said recess to a protruding optical water level sensor embedded in said base of said spine, wherein said bottom portion comprises a cut-out configured to receive said protruding optical water level sensor, and said removable insert comprises a sensor recess for receiving said optical water level sensor, and wherein said optical water level sensor is protected from said soil material by a porous sponge or foam;
wherein information pertaining to water levels in said bottom portion is electrically transmitted from said optical water level sensor over said electrical connections in said spine to said at least one processor, said information being used to control at least one mode of operation of said at least one status indicator light;
and wherein said at least one control switch is used to control at least one mode of operation of said automated terrarium device.

2. The terrarium device of claim 1, wherein said detachable top portion further comprises at least one wireless transceiver; and said at least one processor and wireless transceiver are configured to wirelessly connect and exchange information with other computerized devices using at least one of a Wi-Fi and Bluetooth wireless connection.

3. The terrarium device of claim 1, wherein said at least one processor is configured to use said optical water level sensor and said at least one status indicator light to warn if said water levels are too low.

4. The terrarium device of claim 1, further comprising a visual inspection notch or window configured to enable a water level to be viewed directly.

5. An automated terrarium device, comprising:
a single hollow solid without a door comprising transparent sides, an openable top portion, and a bottom portion, with a spine affixed to one of said transparent sides and configured to connect said top portion to said bottom portion;
said top portion configured to be openable, and further configured with at least one illumination LED;
said device having ventilation openings comprising gaps, indentations, holes, or slits configured in said top portion to allow air to flow into and out of said terrarium when said top portion is mounted on said single hollow solid;
any of said top portion or bottom portion further comprising at least one processor, and further comprising at least one control switch and at least one status indicator light;
said top portion configured to receive electrical power from an electrical connector in said spine;
said bottom portion configured with a recess configured to hold water and a water reservoir, and configured to allow water in said recess to be measured by a protruding optical water level sensor comprising an optical face, embedded in said base of said spine;
said face in contact with a reservoir layer;
said reservoir layer comprising
(i) a porous material, and
(ii) a removable base insert separating soil or other material from said optical water level sensor;
said bottom portion comprising a cut-out configured to receive said protruding optical water level sensor, and said removable base insert comprising a sensor recess for receiving said optical water level sensor;
said device configured
so that information pertaining to water levels in said bottom portion is electrically transmitted from said optical water level sensor over said electrical connections in said spine to said at least one processor, said at least one processor configured so that said information is used to control at least one mode of operation of said at least one status indicator light;

and wherein said at least one control switch is used to control at least one mode of operation of said automated terrarium device.

6. The terrarium device of claim 5, wherein said optical water level sensor is covered by said porous material.

7. The terrarium device of claim 5, wherein said porous material is further configured to enhance a linearity of sensor readings and ensure consistency of measurement between devices and terrarium environments.

8. The terrarium device of claim 5, wherein said top portion further comprises at least one wireless transceiver, and said at least one processor and wireless transceiver are configured to wirelessly connect and exchange information with other computerized devices using at least one of a Wi-Fi and Bluetooth wireless connection.

9. The terrarium device of claim 5, wherein said at least one processor is configured to use said optical water level sensor and said at least one status indicator light to warn if said water levels are too low.

10. The terrarium device of claim 5, further comprising a visual inspection notch or window configured to enable a water level to be viewed directly.

* * * * *